May 10, 1927. 1,627,954
E. M. COLE
ATTACHMENT FOR AGRICULTURAL IMPLEMENTS
Filed Feb. 2, 1924

Inventor
Eugene M. Cole,
J. Hanson Boyden.
Attorney

Patented May 10, 1927.

1,627,954

UNITED STATES PATENT OFFICE.

EUGENE M. COLE, OF CHARLOTTE, NORTH CAROLINA.

ATTACHMENT FOR AGRICULTURAL IMPLEMENTS.

Application filed February 2, 1924. Serial No. 690,179.

This invention relates to attachments for agricultural implements, and more particularly to implements such as single row fertilizer distributers which comprise a beam and handle bars.

In such implements, there are usually provided braces extending downwardly from the handle bars to the beam or to the ground wheel spindle, and the object of the present invention is to provide an attachment in the nature of a pair of brackets which may be readily attached to these braces at any desired height or at any desired point in the length thereof, to which braces are secured plow shanks or cultivator teeth.

More specifically, the object of the invention is to provide such an attachment of exceptionally cheap and simple construction, and which can be applied to existing makes of agricultural implements without in any way modifying them, the attachment being secured to the braces by clamping bolts and held in position by friction only.

The use of such an attachment is often desirable in order to draw in the earth toward the row in which the fertilizer has been distributed, thus filling or listing up the furrow in accordance with the size and nature of the particular plow with which the attachment is equipped.

In order that the invention may be readily understood, reference is had to the accompanying drawing, forming part of this specification, and in which:—

Figure 1:
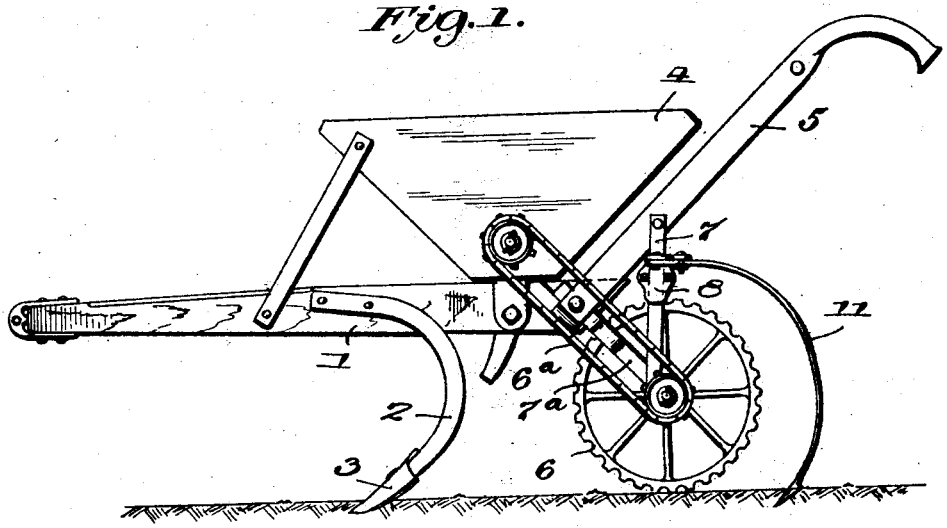
Figure 1 is a side elevation of a fertilizer distributer showing my improved attachment applied thereto.

Referring to the drawings in detail, the fertilizer distributer illustrated by way of example comprises a suitable beam 1, plow shank 2, furrow opener 3, hopper 4, and handle bars 5. A ground wheel 6 is also provided, mounted on a spindle supported by means of braces 7 and $7^a$, the former being substantially vertical and being secured at their upper ends to the handle bars, and the latter being secured to the beam. The ground wheel is also rigid with a sprocket wheel which drives dispensing mechanism in the hopper by means of a sprocket chain $6^n$. All of the above parts may be of the usual or any desired construction and form no part of the present invention.

Figure 3:
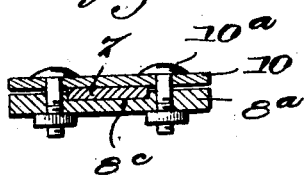
Figure 3 is a transverse section on the line 3—3 of Figure 2, looking in the direction of the arrows.

My invention consists in the provision of a pair of angle brackets 8 and 9, comprising vertical portions or arms $8^a$ and $9^a$, and horizontal portions or arms $8^b$ and $9^b$ respectively, the inside vertical faces of said brackets having grooves $8^c$ and $9^c$ to receive the vertical braces 7, above referred to. The brackets are secured to these braces by means of clamping plates 10, fitted in shallow notches in the brackets and held in position by means of pairs of bolts $10^a$. It will be apparent that by loosening the nuts on these bolts, the brackets may be shifted up or down on the braces 7 at will, and when they have been adjusted to the desired position, they are frictionally held in place by tightening up the nuts on the clamping bolts $10^a$, thus gripping the braces 7 between the clamping plates 10 and the brackets, as will be obvious from an inspection of Figure 3.

Pivotally secured to the underside of the horizontal portion of each bracket by means of a pivot bolt 12 is the upper end of a plow shank or the like 11, such shank carrying at its lower end any desired style of plow or cultivator and being preferably formed of resilient strap steel after the manner of a spring tooth harrow.

Figure 2:
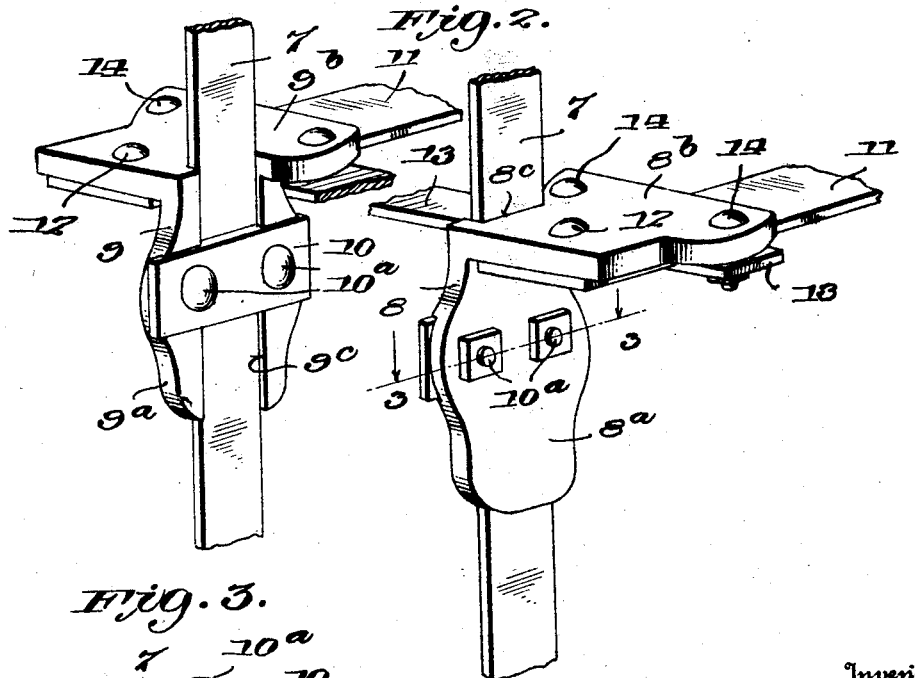
Figure 2 is a fragmentary detailed perspective view on an enlarged scale showing the structure of the brackets and clamping means which I employ.

A tie bar 13, preferably in the nature of a piece of strap iron, extends across from one bracket to another and is secured to the underside of the horizontal portions of the brackets by means of bolts 14. From an inspection of Figure 2, it will be observed that the plow shanks 11 lie between the tie bar 13 and the lower face of the horizontal portions $8^b$ and $9^b$ of the brackets, and also pass between the respective pairs of bolts 14. By virtue of this construction, it is obvious that by loosening the bolts 14, the shanks 11 may be swung about their pivots 12 and thus angularly adjusted relative to each other and to the ground wheel, and that by tightening up the bolts 14, the said shanks may be firmly held in any position to which they have been adjusted. Thus, the plows or cultivator teeth carried by the shanks 11 may be set to run at different lateral distances from the ground wheel, as required, and may also be adjusted vertically so as to enter the ground to a greater or less extent.

What I claim is:—

1. An attachment for agricultural implements having a beam, handle bars, and substantially vertical braces extending downwardly from the handle bars, said attachment comprising a bracket having two angularly disposed arms, means for clamping one arm of such bracket to one of said braces at any desired point longitudinally thereof, and a plow shank having its upper end secured to the other arm of said bracket.

2. An attachment for agricultural implements having a beam, handle bars, and substantially vertical braces extending downwardly from the handle bars, said attachment comprising an angle bracket having two arms, means for clamping one arm of such bracket to one of said braces at any desired point thereof, a plow shank having its upper end pivotally secured to the other arm of said bracket so as to be capable of lateral angular adjustment, and means carried by said last mentioned arm for clamping said shank in adjusted position.

3. An attachment for agricultural implements having a beam, handle bars, and braces extending downwardly from the handle bars, said attachment comprising a pair of independent brackets each having angularly disposed portions, means for individually clamping one portion of said brackets to said braces at any desired point thereof, a plow shank attached to each of said brackets, and a tie bar secured to the other portion of said brackets, and extending between them.

4. An attachment for agricultural implements having a beam, handle bars, and braces extending downwardly from the handle bars, said attachment comprising a pair of independent brackets, means for individually clamping said brackets to said braces at any desired point thereof, a tie bar secured to and connecting said brackets, and a plow shank pivotally attached to each bracket, and clamped between a part of such bracket and said tie bar, whereby said plow shanks may be held in adjusted position.

In testimony whereof I affix my signature.

EUGENE M. COLE.